July 8, 1941.   A. M. GAGE   2,248,073
PULSATOR FOR FLUIDS
Filed Jan. 13, 1938   2 Sheets-Sheet 1

INVENTOR
ANDRÉ MARTIAL GAGE
By: Haseltine, Lake & Co.
ATTORNEYS

July 8, 1941.   A. M. GAGE   2,248,073
PULSATOR FOR FLUIDS
Filed Jan. 13, 1938   2 Sheets-Sheet 2

INVENTOR
ANDRÉ MARTIAL GAGE
By: Haseltine, Lake & Co.
ATTORNEYS

Patented July 8, 1941

2,248,073

UNITED STATES PATENT OFFICE 2,248,073

PULSATOR FOR FLUIDS

André Martial Gage, Saint-Ouen, France

Application January 13, 1938, Serial No. 184,781
In France October 20, 1937

6 Claims. (Cl. 116—142)

The present invention has for an object a pulsator for fluid of high frequency, that is to say an apparatus which being supplied with a fluid under pressure is capable of producing jets of the said fluid at a high rate, of a variable duration and ranging between the tenth and the fifth of a hundredth of a second and less, every jet being separated from the following one by a free time of the same order of magnitude or not.

This result is obtained through the mere action of the fluid upon a very light flap valve without the intervention of any mechanical device.

According to the invention, use is made of a freely moving flap valve capable of seating alternatively through motions of a small amplitude, on the one side, upon the orifices of an inlet chamber and of an exhaust nozzle, on the opposite side, upon the orifice of a chamber containing a fluid under a suitable pressure acting as a spring so as to cause the flap valve to return to the first orifices as soon as, in moving away from the latter, the said flap valve has put the exhaust nozzle in connection with the inlet chamber thereby determining a drop of pressure in the latter.

The second chamber may be connected to any device capable of maintaining therein a pressure which is intermediate between the pressure of the fluid supplied to the inlet chamber and that of the fluid at the outlet of the nozzle; the same may particularly be connected to the same source as the inlet chamber and may comprise as the latter a nozzle whose inner orifice is also controlled by the flap valve; in this latter case, the pressures within the two inlet chambers vary inversely, owing to the fact that the valve allows the fluid to escape alternatively through both nozzles.

The frequency of pulsations depends from the stroke and the inertia of the flap valve, which may be very small; it also depends upon the rapidity of the variations of pressure in the opposite chambers, and consequently upon the volume of the latter, upon the losses of load in starting from the source of fluid under pressure, and the like.

It must be observed that the flap valve may be exempt from any frictional resistances and from the inertia of springs or mechanical members, and the like. Under these conditions, the frequency of pulsations obtained may very easily be of the order of the audible vibrations and reach or create through resonance ultra-sounds.

Owing to its simplicity, the apparatus may be advantageously used for a large number of uses.

The accompanying drawings show diagrammatically, in axial section, a few embodiments of the object of the invention, given by way of examples and represented in axial section.

Fig. 1 diagrammatically shows in section a first embodiment of the principle of the invention.

Figure 1:
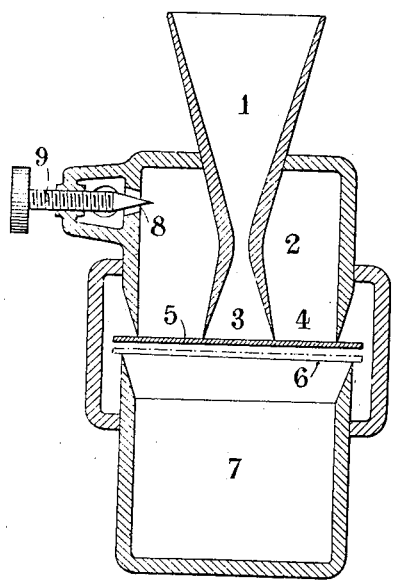

According to Fig. 1, the pulsator comprises a nozzle 1 for the expansion of the fluid and an inlet chamber 2 constituting a reserve of fluid for feeding the nozzle. The nozzle 1 and the chamber 2 are provided with orifices 3 and 4.

The orifices 3 and 4 may be closed simultaneously by a flap valve 5 consisting in a thin and light disc. The said valve may rest alternatively upon the orifices 3 and 4 and upon the orifice 6 of a chamber 7 situated on the side opposite to the valve. The distance between the orifices 3 and 4, on the one hand, and 6, on the other hand, is small.

The fluid under pressure comes into the chamber 2 through a port 8 controlled by a needle-valve 9 or gauge. The said port may moreover be of any shape.

In the chamber 7, the same fluid or another fluid is maintained under an intermediate pressure between that of the admission of fluid through the port 8 and that of the exhaust at the outlet of the nozzle 1. Said pressure may be produced and maintained within chamber 7 by various means not shown, as such means do not form any part of the present invention and are not essential to an understanding of the latter.

When the valve 5 is seating on the orifice 6, the chamber 2 supplies the nozzle 1 through the orifices 4 and 3. When the inlet 8 is regulated in such manner that the quantity of fluid arriving through 8 is smaller than the one leaving through the nozzle 1 then the pressure drops in the chamber 2. As soon as the said pressure becomes smaller than the pressure at 7, the valve 5 passes from the seat 6 to the seats 3 and 4. The delivery of fluid is then cut off.

But as fluid continues to be supplied through 8, the pressure rises again in the chamber 2. When the thrust resulting from the pressure existing in the chamber 2, combined with the pressure which may still exist at the orifice 3, exceeds the resultant on the valve 5 of the pressure at 7, the valve 5 returns to the orifice 6, the chamber 2 again supplies the nozzle 1 and the play is repeated.

Whereas there is no mechanical member (spring, guide) entering into action, the alternance of the jets and of the interruptions may repeat itself many times per second, because the valve 5, having a very small inertia, practically follows all inversions of pressure even when they take place in a very rapid manner. For the purpose of determining the frequency of the said inversions and the duration of the jet within the whole period, the mass and the stroke of the flap valve being given, it will be sufficient to calculate conveniently the various orifices and the volumes of the chambers.

Figure 2:
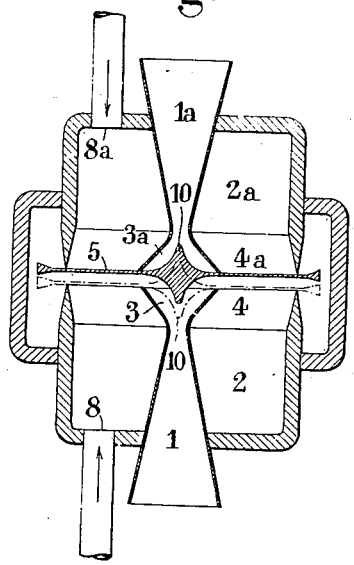
Figs. 2, 3, 4, 5, 6 show five other embodiments.

A particularly easy method for regulating the pressure in the chamber 7 is given by way of example in Figure 2.

One disposes symmetrically two nozzles 1 and 1a and two chambers 2 and 2a supplied by the orifices 8 and 8a from a same source of fluid under pressure and having their orifices 3 and 4, 3a and 4a alternatively closed by the flap valve 5.

In this embodiment of the pulsator, when the flap valve is seated upon 3a and 4a, the chamber 2a fills itself and its pressure rises, while the chamber 2 is exhausted and its pressure sinks. Then comes a moment where, although the pressure in 1a is small, the thrust in 3a—4a is higher than the pressure in 3—4. The valve then leaves 3a—4a and seats on 3—4.

This leads to the same result as the device which has been hereinbefore described.

In Fig. 2, the flap valve 5 is centrally provided with tapering bosses 10 entering into the nozzles and securing an automatic centering of the valve 5 through the circulation of the fluid itself.

It will be obvious that the arrangement of every nozzle and of its supply chamber may vary; for example, the flap valve, instead of clapping in order to successfully close up the orifices, may move in any way and may particularly oscillate.

Figure 3:
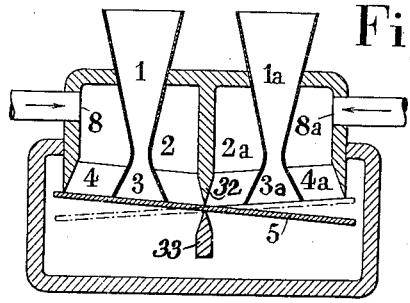
Figure 4:
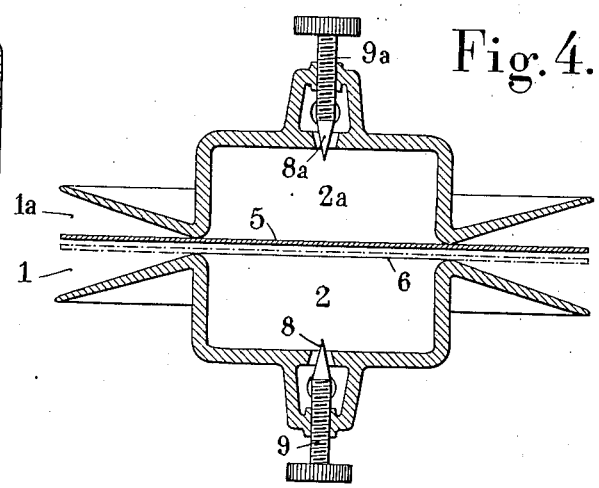

Fig. 3 shows an embodiment in which the chambers 2 and 2a are disposed the one next to the other and in which the flap valve 5 is oscillating between two fixed seats 32 and 33 and Fig. 4 shows another embodiment wherein the nozzles 1 and 1a are in the shape of obtuse frustums extending outside the periphery of the chambers 2 and 2a; in this case, the valve 5 bears alternatively against the opposite circular edges of the two nozzles. It is neither necessary at all for the chambers to surround the nozzles; they may be simply juxtaposed to the latter, or even be remote therefrom.

The attention is to be drawn upon the fact that the opening 4 of the chamber 2 is represented in the figures by two seats upon which the valve 5 comes to bear. It is quite obvious that if the spaces within the nozzle 1 and outside said nozzle in the chamber 2 must be separated by a tight application of the valve 5 upon the orifice 3, on the contrary, the separation between the chamber 2 and the chambers 7 or 2a does not require to be perfectly tight. Accordingly, it is not unavoidable to have at this point an accurate seating and the relative tightness may be obtained in having slight play between the flap valve 5 and the walls surrounding the same.

Figure 5:
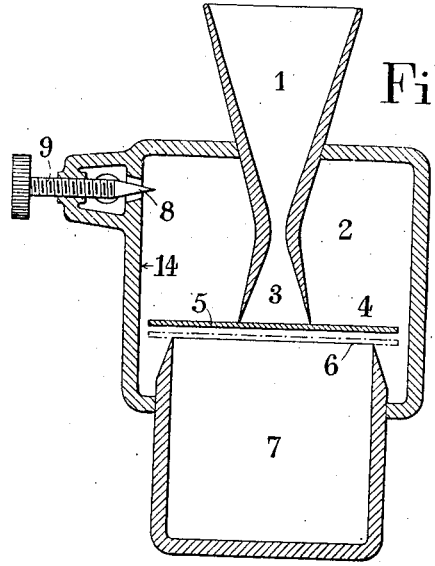
Figure 6:
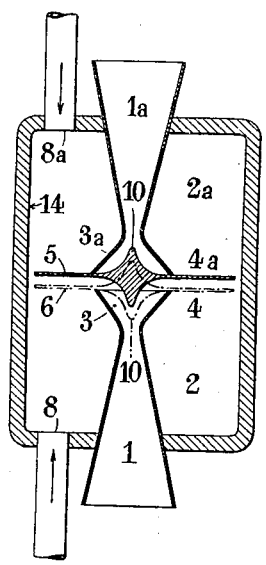

Figs. 5 and 6 show two embodiments of this kind resulting from the modified form according to Figs. 1 and 2, by the fact that the valve 5 separates the chambers 2 from 7 or 2a simply owing to the slight play provided for between its periphery and the wall 14.

The pulsator according to the present invention may be used in connection with various existing industrial apparatuses.

Figure 7:
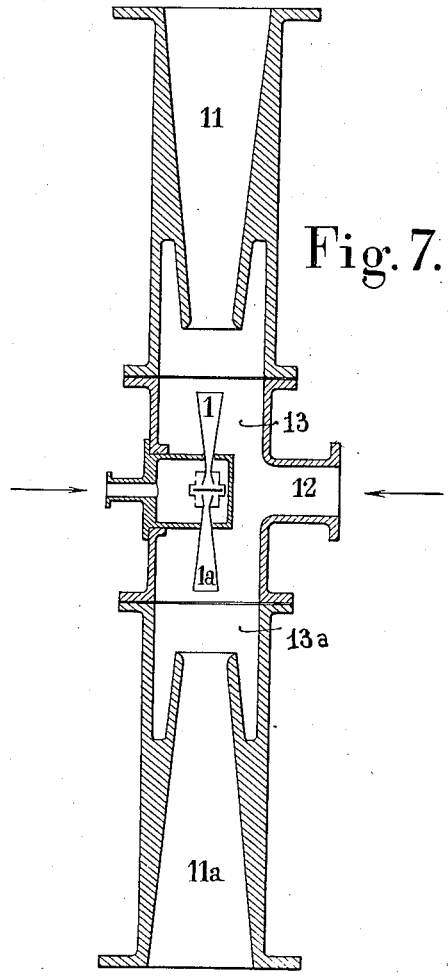
Fig. 7 shows an application of the principle of the invention to steam or compressed air ejectors.

Fig. 7 shows the same as being used in connection with steam or compressed air injectors. In the existing injectors, a continuous jet generated by a nozzle drives along the particles of the fluid which are to be sucked into a diverging duct or owing to their loss of speed their pressure increases so that they pass into a medium of a relatively high pressure.

In an improved ejector according to the invention, the outlet diverging duct 11 is substantially maintained and the suction at 12 into the low pressure medium is realized in a suitable manner, but the nozzle for the continuous injection of the motive fluid is replaced by the nozzle 1 of the present pulsator. When the pulsator is of the type comprising two nozzles 1, 1a, use can be made of two diverging ducts 11, 11a, as in Fig. 7, or the said two nozzles may be directed towards a same diverging duct.

It is a known fact that the ejectors work through impact of the high rate particles of the motive fluid against the particles of the fluid to be driven along. In a common ejector, the said impact takes place but on the periphery of the fluid vein of the jet. On the contrary, with the present ejector, the fluid sucked into the mixing chamber 13 or 13a fills, during the interruptions of the jet, the space which was previously occupied by the latter and it is then struck in full by the following jet; the jet is then utilised with the whole of its surface, this resulting in a much greater efficiency. Moreover, the successive volumes of motive fluid sent by the pulsator form as many moving pistons which move at rates which are greater than the one of the sound and create behind them a vacuum capable of speeding up by expansion the sucked fluid and of consequently reducing the losses of power in the impact of the two fluids.

The present invention also relates to the construction of an organ without pipes or at least an organ the pipes of which are reduced to a small length.

In fact, the pulsatory jet of the apparatus may be so devised as to operate at a musical frequency and may in any case be combined with organ pipes for the purpose of creating any required musical frequency. The same shows this advantage that in causing the orifice 8 or the volume of the chamber 2 to vary, it is possible to vary at will the frequency of the pulsatory jet and to accordingly create with a single organ pipe a great number of different sounds, thereby enabling to reduce to a considerable extent the number of pipes.

The invention further allows to make powerful sirens with the possibility of modulating the sound at will. The pulsatory jet having a musical frequency, it will in fact only be necessary to amplify the same by means of a sound horn for transforming the pulsator into a siren. The said siren possesses over many known sirens this advantage that it does not include any mechanism of an expensive arrangement and maintenance. One may easily modulate the sound in varying the orifice 8 or the volume of the chamber 2 or even the pressure of supply.

It is further possible to utilize the present invention for the production of ultra-sounds which may be used for instance for locating moving pieces, for warning purposes, for submarine soundings, for precipitating fogs and the like purposes. It is in fact only necessary to regulate the pulsator according to the required non-audible frequency or to combine it with a suitable resonator in order to transform the same into a generator of ultra-sounds. It has over many senders the advantage of being of a great simplicity combined with a considerable power.

For the purpose of generating ultra-sounds, by means of the pulsator of fluid as described, one of the three following methods may be resorted to:

1st. It is possible with the pulsator as described to obtain a jet of fluid of an exceedingly short duration, for instance of the order of $\frac{1}{15000}$ to $\frac{1}{25000}$ of a second; it is indeed only necessary for the chamber 2 to be very small relatively to the nozzle 1 and for the supply orifices 8 to be very small. The said duration of the jet is not to be confounded with the period of the pulsation which, owing to the filling of the chamber 2 and the movement of the flap valve 5, will be much longer.

Figure 8:
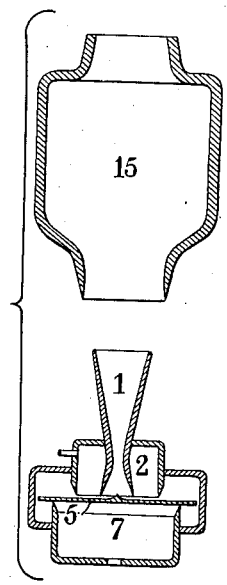
Fig. 8 shows an application of the principle of the invention to resonators.

2nd. To the nozzle 1 may be given a suitable shape and length or the jet may be received on a resonator 15 which is represented in Figure 8 as consisting in a hollow cylinder but which may be constructed according to any one of the numerous known ways; the sole jet may be converted into a series of oscillations at the frequency of the ultra-sounds.

Figure 9:
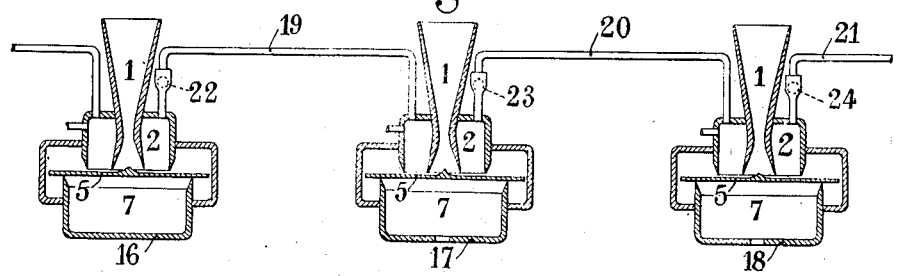
Fig. 9 shows an assemblage in series of several elementary apparatus according to Fig. 1.

3rd. It is possible to make use of several pulsators 16, 17, 18, and so on (Figure 9) so regulated as to have a same period or conveniently different periods and whose chambers 2 are cascade connected by means of the pipes 19, 20, 21, and so on, in the interior of which is located a small ball 22, 23, 24, and so on, or any other member forming a non-return valve; synchronization owing to successive discharges of the pulsators according to the order 16, 17, 18, and so on, is thus obtained.

If the non-return valves 22, 23, 24 and the like were not present, the pressures would, shortly after the apparatus has been set in action, simultaneously rise in all the chambers 2 notwithstanding the unavoidable or wanted differences of period on the various pulsators. The valves 22, 23, 24, in favorizing a direction of flow, create a slight advance in the rise of pressure and consequently of the exhausts, as regards 16 in connection with 17 and as regards 17 in connection with 18, and so on.

With a chain of these pulsators closing upon 16, it is possible to obtain a regularly time spaced sequence of very short jets of fluid capable of creating or maintaining the oscillations of ultra-sounds.

On the other hand, the present invention may be used for improving the combustion in furnaces. In fact, some authors claim with some likelihood that the vibration with a rapid frequency of the mass of air of a hearth improves the mixture of the fuel and of the combustion supporter and improves the combustion; the above described pulsator may be used for determining the vibration of the air.

These various uses are cited by way of examples and do not in any way limit the invention.

I claim:

1. A pulsating apparatus for fluid, comprising in combination, a chamber having an inlet orifice connected to a source of fluid under pressure, an outlet nozzle extending outwardly from the interior of said chamber through the wall of the latter, a valve seat secured to said chamber, a light and rigid floating valve so located and arranged with respect to the outlet nozzle and the valve seat as to be effective to bear alternately upon the inner orifice of said outlet nozzle and upon said valve seat by means of a limited displacement of said rigid valve without the latter having to distort on one side or on the other, or to resiliently distort any solid member, a mixing chamber surrounding the outlet nozzle, a divergent tube co-axial with the outlet nozzle and having an inlet orifice spaced a certain distance from the outlet orifice of said outlet nozzle, and a suction tube opening into said mixing chamber, said rigid valve being conditioned and effective to cooperate with walls of said chamber so as to divide the latter into two capacities which are thus substantially separated the one from the other, said inlet orifice connected to the source of fluid pressure opening into the same one of said two capacities into which the inner orifice of the outlet nozzle also opens.

2. A pulsating apparatus for fluid comprising a chamber having an inlet orifice connected to a source of fluid under pressure, an outlet nozzle extending outwardly from the interior of said chamber through the wall of the latter, a valve seat secured to said chamber, a light, rigid and floating valve so arranged as to bear alternately upon the inner orifice of said nozzle and upon said seat owing to a small displacement of said valve, said rigid valve being adapted to cooperate with walls of said chamber so as to divide the latter into two compartments, which are thus substantially separated the one from the other, said inlet orifice opening into the one of these compartments where said outlet orifice is located, a second fluid inlet orifice provided for in the compartment opposite that provided with said inlet orifice previously mentioned, a second nozzle extending from the interior of said opposite compartment to the exterior through its wall, the inner edge of each of the two nozzles constituting a seat on which said light, rigid and floating valve presses when it moves away from the other nozzle.

3. A pulsating apparatus for fluid comprising a chamber having an inlet orifice connected to a source of fluid under pressure, an outlet nozzle extending outwardly from the interior of said chamber through the wall of the latter, a valve seat secured to said chamber, a light, rigid and floating valve so arranged as to bear upon the inner orifice of said nozzle and upon said seat owing to a small displacement of said valve, said rigid valve being adapted to cooperate with walls of said chamber so as to divide the latter into two compartments, which are thus substantially separated the one from the other, said inlet orifice opening into the one of these compartments where said outlet orifice is located, a second fluid inlet orifice provided for in the compartment opposite that provided with said inlet orifice previously mentioned, a supplementary seat formed on the inner wall of the compartment containing said previously mentioned inlet orifice and arranged in such a manner, that said valve presses both on the nozzle provided for in this compartment and on said supplementary seat when it moves away from said valve seat secured to said chamber.

4. A pulsating apparatus for fluid comprising a chamber having an inlet orifice connected to a source of fluid under pressure, an outlet nozzle extending outwardly from the interior of said chamber through the wall of the latter, a valve seat secured to the wall of the latter, a light, rigid and floating valve so arranged as to bear alternately upon the inner orifice of said nozzle and upon said seat owing to a small displacement of said valve, said rigid valve being adapted to cooperate with walls of said chamber so as to divide the latter into two compartments, which are thus substantially separated the one from the other, said inlet orifice opening into the one of these compartments where said outlet orifice is located, a second fluid inlet orifice provided for in the compartment opposite that provided with said inlet orifice previously mentioned, a second nozzle extending from the interior of said opposite compartment to the exterior through its wall, a supplementary seat on the inner wall of the compartment, containing said previously mentioned inlet orifice, the inner edge of each nozzle constituting a seat on which said floating valve presses at the same time as on the seat formed on the inner wall of the corresponding compartment when it moves away from the other nozzle.

5. In an apparatus for producing sounds by pulsations of a fluid under pressure, the combination of a chamber, a light, rigid, disc-shaped and floating oscillatory plate in said chamber, not subjected to any elastic deformation, located with a small lateral play in said chamber and arranged for dividing said chamber into two compartments, an outlet nozzle projecting in one of said compartments and forming an annular seat in said compartment and against which said plate can be applied with one of its faces, an annular seat formed on the inner wall of said compartment, this seat surrounding the seat of said nozzle and being placed at a same level, means for connecting said compartment to a source of a fluid under pressure, an annular seat formed on the inner wall of the second compartment and against which said plate can be applied with its other face, the level of this annular seat being separated from the annular seat of said nozzle and from the annular seat formed on the inner wall of the compartment containing said nozzle by a distance for allowing a small movement of said plate and means for connecting this second compartment to a source of fluid, the pressure of which is intermediate between the pressure of the fluid introduced in the compartment containing said nozzle and the pressure of the fluid leaving said nozzle.

6. In an apparatus for producing sounds by pulsations of a fluid under pressure, the combination of a chamber, a light, rigid, disc-shaped and floating oscillatory plate in said chamber, not subjected to any elastic deformation, located with a small lateral play in said chamber and arranged for dividing said chamber into two compartments, an outlet nozzle projecting in each of said compartments and forming an annular seat in these compartments and against which said plate can be applied with its corresponding face, means for connecting each of said compartments to a source of fluid under pressure, an annular seat formed on the inner wall of each of said compartments, surrounding and placed at a same level with the annular seat formed by the corresponding nozzle, said seats and said nozzles being arranged co-axially and said seats being separated from each other by a distance for allowing a small movement of said plate.

ANDRÉ MARTIAL GAGE.